Figure 1:
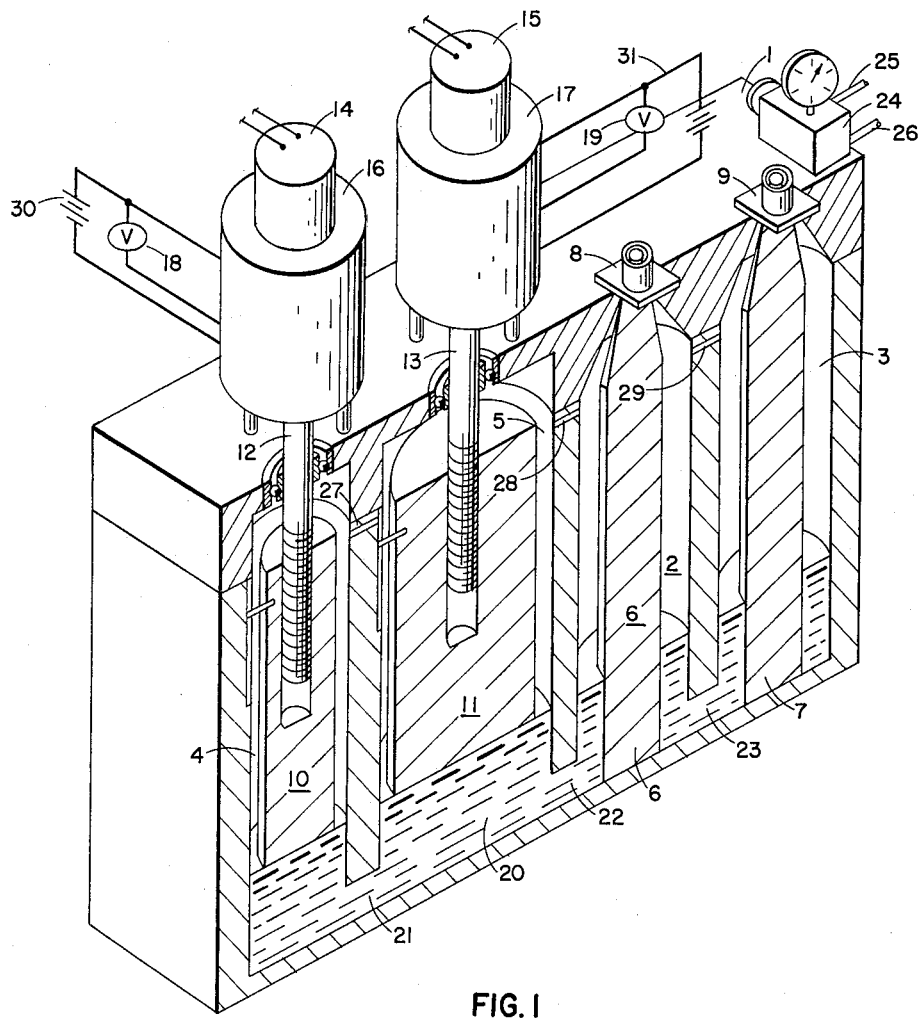

Oct. 12, 1965 — L. W. ROOT, JR — 3,212,037

VARIABLE ELECTROMAGNETIC SHORT CIRCUIT

Filed Jan. 10, 1964

Lloyd W. Root Jr.,
INVENTOR.

United States Patent Office 3,212,037
Patented Oct. 12, 1965

3,212,037
VARIABLE ELECTROMAGNETIC SHORT CIRCUIT
Lloyd W. Root, Jr., Huntsville, Ala., assignor to the United States of America as represented by the Secretary of the Army
Filed Jan. 10, 1964, Ser. No. 337,104
19 Claims. (Cl. 333—98)
(Granted under Title 35, U.S. Code (1952), sec. 266)

The invention described herein may be manufactured and used by or for the Government for governmental purposes without the payment of any royalty thereon.

The present invention relates to a device for simultaneously varying and accurately monitoring the position of one or more short circuits for electromagnetic energy. Through the use of proper circuits this device provides an accurate variable electrical pathlength for the transmission of electromagnetic energy. This type device is sometimes referred to as a continuously variable phase shifter or a variable delay line. The device may also be used as a means to provide precision tuning of the resonance of an electromagnetic cavity.

In the past many types of variable short circuits have been utilized. However, none of the presently available variable short circuits whether mechanical or electronic provide the dependability and precision necessary for calibrating various electromagnetic instrumentation with the accuracy which is required by the now advanced state of electromagnetic technology. Previously, calibration of precise electromagnetic instruments required the purchase of individual electromagnetic short circuits of known electrical length. These devices are extremely expensive and must be handled with the greatest of care. Further, the availability of these short circuits is limited in that it would not be practical to maintain a supply sufficient to meet the everyday requirements of an electromagnetic laboratory.

Accordingly, one object of my invention is to provide an electromagnetic short circuit of variable length.

Another object of my invention is to provide an electromagnetic short circuit which is extremely precise in providing an electromagnetic transmission line with a predetermined electrical length.

Yet another object of my invention is to provide an electromagnetic short circuit which may be attached to any electromagnetic transmission line or device.

Still another object of my invention is to provide a device which will vary the electrical length of an electromagnetic transmission line and which will monitor the amount of variance in the electrical length.

Yet another object of my invention is to provide a variable electromagnetic short circuit which is extremely accurate and dependable while yet being relatively inexpensive.

Still a further object of my invention is to provide a device in which the electrical length of a plurality of transmission lines may be made exactly equal and may be varied in unison.

This invention together with other objects and advantages thereof will best be understood by reference to the following description and the accompanying drawings, in which:

FIGURE 1 is a perspective view of an embodiment of my invention having portions thereof cut away for purposes of clarity.

Referring now to FIGURE 1, formed within housing 1 are a pair of microwave chambers 2 and 3 and a pair of cavities 4 and 5. These microwave chambers may take the form of a wave guide, a gas dielectric strip transmission line, a coaxial transmission line or any suitable path that electromagnetic energy will follow. The microwave chambers illustrated in FIGURE 1 are adapted for attachment to coaxial transmission lines and are provided with centrally located conductors 6 and 7. The device may be provided with any number of microwave chambers. A pair of coaxial connectors 8 and 9 are attached at the upper end of the microwave chambers for connection to coaxial transmission lines. The type of connector attached to the microwave chamber will of course depend upon the type of electromagnetic network which is to be attached to the microwave chamber. This network may include a 3 db hybrid coupler, a directional coupler, a circulator, a magic T or a circular ring hybrid, or any type of electromagnetic energy conductor. Mounted within cavities 4 and 5 are a pair of loosely fitted volume blocks 10 and 11. These blocks are attached by means of threaded rotatable shafts 12 and 13 to electric motors 14 and 15, respectively. Immediately beneath these motors is mounted a pair of potentiometers 16 and 17 which are attached to housing 1 and act as supports for motors 14 and 15 respectively.

A wiper arm (not shown) is attached to each of the shafts and rotates within each potentiometer in direct contact with a multiwound coil located within said potentiometers in the conventional manner. Power supplies 30 and 31 supply current for actuation of the potentiometer circuits. Rotation of shafts 12 or 13 will rotate a wiper arm within its respective potentiometer thus causing a variation in potential which will be indicated at 18 and 19. Thus, a means is provided for monitoring the position of the volume blocks which of course will be moved vertically upon rotation of shafts 12 or 13. A liquid 20 is provided in housing 1 and although it may be extremely conductive it need not be, since it may be required to reflect all or any portion of the supplied electromagnetic energy. Passages 21, 22 and 23 provide fluid communication between each of the cavities as well as the microwave chambers. Thus, it will be seen that vertical movement of the smaller of the volume blocks will cause a slight variation in the liquid height within the microwave chambers, while vertical movement of the large volume block will cause a proportionately greater height variation. A pressure regulator 24 is connected in fluid communication with the interior of the device and is provided with an inlet 25 and an outlet 26. The purpose of this regulator is to provide the desired atmosphere and pressure to the interior of the device. Liquids such as mercury are often used in the device and have corrosive effects upon some materials unless provided with the proper atmosphere. In the case of mercury a helium atmosphere would retard corrosion. A series of vents 27, 28 and 29 are provided between the individual cavities to equalize the pressure throughout the housing.

In operation of the device, an electromagnetic energy transmitting network will be attached to the microwave chambers by means of connectors 8 and 9. The electrical length of the microwave chambers may then be varied by vertical movement of volume blocks 10 or 11, which causes variation in the height of the liquid in the microwave chambers. After calibration of the device the exact amount of the liquid variance may be indicated by the monitoring system provided in the form of potentiometers 16 and 17 and meters 18 and 19. Thus it will be seen that the device provides an extremely precise microwave short which may be used to calibrate slotted lines using the nodal tangent methods, and in addition provides a means for obtaining continuous rather than incremental data. The device may also be used as a precision phase shifter of a precision delay line in interferometer type of measurements and the device is equally applicable for use in any situation in which the electrical length of a microwave line must be varied for any reason.

While the foregoing is a description of a preferred embodiment, the following claims are intended to include

I claim:

1. A variable electromagnetic short circuit comprising; a housing, at least one mircrowave chamber within said housing, a connector attached to one end of said chamber for reception of a microwave network, at least one cavity formed in said housing, a loose fitting volume block mounted in said cavity and extending less than the full length thereof, means for moving said block generally vertically in said cavity, means providing fluid communication between said cavity and said chamber, an electromagnetic energy reflecting liquid conductor partially filling said chamber and said cavity whereby the liquid level in said chamber may be varied in response to vertical movement of said volume block, and means for indicating the relative height of the liquid conductor in said cavity.

2. A device as set forth in claim 1 wherein said housing contains a plurality of microwave chambers, and connector means attached to one end of each of said chambers for connection of a microwave network.

3. A device as set forth in claim 2 wherein said housing contains a plurality of cavities of unlike sizes, a volume block of appropriate size loosely mounted in each of said cavities and extending less than the full vertical length thereof, means for moving said blocks in a vertical direction in each of said cavities and means for providing general fluid communication between said plurality of cavities and said plurality of chambers whereby vertical movement of the larger of said blocks in its respective cavity will cause a relatively large variation in the height of the liquid conductor in said mircrowave chambers and vertical movement of the smaller of said blocks will cause a lesser change in the height of the liquid conductor in said mircrowave chambers.

4. A variable electromagnetic short circuit comprising; a housing, a pair of electromagnetic transmission lines within said housing, connector means attached to one end of each of said electromagnetic transmission lines for attachment of an electromagnetic network, a pair of cylindrical cavities formed in said housing, one of said cavities being relatively small in diameter compared to the other of said cavities, each of said cavities having a loose fitting cylindrical volume block mounted therein and extending less than the full length of said cylindrical cavities, means for moving said cylindrical blocks lengthwise in their respective cylindrical cavities, means for indicating the relative position of each of said blocks in its respective cavity, and a conducting liquid partially filling said cavities and said chambers, whereby movement of either or both of said volume blocks will cause the effective height of the liquid in said chambers to vary.

5. A device as set forth in claim 4 wherein the means for moving said volume blocks comprises electric motors and threaded shafts operatively connected between said motors and said blocks.

6. A device as set forth in claim 5 wherein said means for indicating the position of said blocks comprises a plurality of precision multiturn potentiometers operatively connected to said block.

7. A device as set forth in claim 6 wherein said liquid is mercury.

8. A device as set forth in claim 7 wherein said transmission line connectors are adapted to receive a coaxial mircrowave network.

9. A variable electromagnetic short circuit comprising; a housing, at least one electromagnetic transmission line within said housing, connector means attached to one end of said electromagnetic transmission line for attachment of an electromagnetic network, at least, one cylindrical cavity formed within said housing, said cavity having a loose fitting cylindrical volume block vertically mounted therein and extending less than the full vertical length of said cylindrical cavity, means for moving said cylindrical block vertically in its cavity, means for indicating the relative position of said block in its cavity, means providing fluid communication between said cavity and said transmission line and an electromagnetic energy reflecting liquid partially filling said housing whereby vertical movement of said volume block will cause a variation in the effective height of the liquid in said transmission line.

10. A device as set forth in claim 9 wherein the means for moving said volume block comprises an electric motor and a rotatable shaft one end of said shaft being operably attached to said motor and the other end being threadedly attached to said volume block.

11. A device as set forth in claim 10 wherein the means for indicating the position of said block comprises a precision potentiometer operatively connected to said block.

12. A device as set forth in claim 11 wherein said liquid is mercury.

13. A device as set forth in claim 12 wherein said connectors are adapted to receive a coaxial mircrowave network.

14. A variable electromagnetic short circuit comprising; a housing, a chamber in said housing, at least one electromagnetic transmission line mounted in said chamber and supplied with electromagnetic energy means, an electromagnetic energy reflecting liquid partially filling said chamber, and means including adjustable means in said housing for displacing said liquid upon appropriate adjustment of said adjustable means to accurately vary the height of said liquid within said transmission line and thereby accurately vary said electromagnetic short circuit.

15. A device as set forth in claim 14 wherein means are provided for monitoring the variance of said liquid height.

16. A variable electromagnetic circuit comprising; a housing, at least one microwave chamber within said housing, connector means at one end of said chamber connecting microwave energy means to said chamber, a liquid partially filling said chamber, and means including adjustable means in said housing and in contact with said liquid, said adjustable means being adapted to accurately vary the liquid level in said chamber by appropriate adjustment of said adjustable means relative to said liquid to thereby accurately vary the variable circuit.

17. A variable electromagnetic circuit as set forth in claim 16, wherein said liquid is extremely conductive to said microwave energy.

18. A variable electromagnetic circuit as set forth in claim 16, wherein said means for accurately varying the liquid level includes potentiometer indicator means.

19. A variable electromagnetic circuit comprising; a housing, at least one microwave chamber within said housing, connector means at one end of said chamber connecting microwave energy means to said chamber, a liquid partially filling said chamber, and means for accurately varying the liquid level including at least one cavity in said housing in fluid communication with said chamber, at least one block in said cavity, and accurate adjusting means connected to said block for accurately adjusting said block to accurately adjust the liquid level in said chamber and thereby accurately vary the variable circuit.

References Cited by the Examiner

UNITED STATES PATENTS

| | | | |
|---|---|---|---|
| 1,258,050 | 3/18 | Simmon | 338—86 |
| 2,375,084 | 6/43 | Coroniti | 331—65 |

ELI LIEBERMAN, *Primary Examiner.*

HERMAN KARL SAALBACH, *Examiner.*